(12) United States Patent
Lee

(10) Patent No.: US 7,140,538 B2
(45) Date of Patent: Nov. 28, 2006

(54) METHODS AND APPARATUS FOR FACILITATING A CURRENCY EXCHANGE TRANSACTION

(75) Inventor: Seon Ho Lee, Kent (GB)

(73) Assignee: Fidos Ltd. (GB)

( * ) Notice: Subject to any disclaimer, the term of this patent is extended or adjusted under 35 U.S.C. 154(b) by 0 days.

(21) Appl. No.: 10/947,037

(22) Filed: Sep. 22, 2004

(65) Prior Publication Data

US 2006/0060646 A1    Mar. 23, 2006

(51) Int. Cl.
    *G06F 17/60* (2006.01)
(52) U.S. Cl. ............ 235/379; 235/375; 705/39; 705/40; 705/43; 705/44
(58) Field of Classification Search ............. 235/379, 235/375; 705/39, 40, 43, 44
    See application file for complete search history.

(56) References Cited

U.S. PATENT DOCUMENTS

| | | | |
|---|---|---|---|
| 4,150,740 A | 4/1979 | Douno | |
| 4,251,867 A | 2/1981 | Uchida et al. | |
| 5,813,510 A * | 9/1998 | Rademacher | 235/379 |
| 6,003,008 A | 12/1999 | Postrel et al. | |
| 6,390,366 B1 | 5/2002 | Heidenreich et al. | |
| 6,763,924 B1 | 7/2004 | Olbrich | |
| 2001/0038033 A1 | 11/2001 | Habib | |
| 2002/0107793 A1 * | 8/2002 | Lee | 705/40 |
| 2002/0111790 A1 | 8/2002 | McBrearty et al. | |
| 2002/0161707 A1 * | 10/2002 | Cole et al. | 705/42 |
| 2003/0040959 A1 | 2/2003 | Fei et al. | |
| 2003/0046234 A1 | 3/2003 | Takadachi | |
| 2003/0057271 A1 * | 3/2003 | Andersen et al. | 235/379 |
| 2004/0016796 A1 * | 1/2004 | Hanna et al. | 235/375 |
| 2004/0267666 A1 * | 12/2004 | Minami et al. | 705/43 |
| 2005/0038747 A1 * | 2/2005 | Drummond et al. | 705/43 |
| 2005/0131824 A1 * | 6/2005 | Drummond et al. | 705/43 |

FOREIGN PATENT DOCUMENTS

| | | |
|---|---|---|
| GB | 2376124 A | 12/2002 |
| WO | WO 99/21141 | 4/1999 |
| WO | WO 00/72191 | 11/2000 |
| WO | WO 03/071386 | 8/2003 |

OTHER PUBLICATIONS

International Written Opinion for PCT/GB05/003575, Nov. 24, 2005, Fidos LTD.
International Search Rept, Nov. 25, 2005.

* cited by examiner

Primary Examiner—Thien M. Le
Assistant Examiner—Allyson N Trail
(74) Attorney, Agent, or Firm—Kaplan Gilman Gibson & Dernier LLP

(57) ABSTRACT

Methods and apparatus for prompting a user to enter currency of a first country including at least one of notes and coins into a foreign exchange kiosk; applying one or more currency exchange rates to a total of the entered currency to compute a converted currency amount of a second country; and conducting a money transfer with a third party based on the converted currency amount.

24 Claims, 5 Drawing Sheets

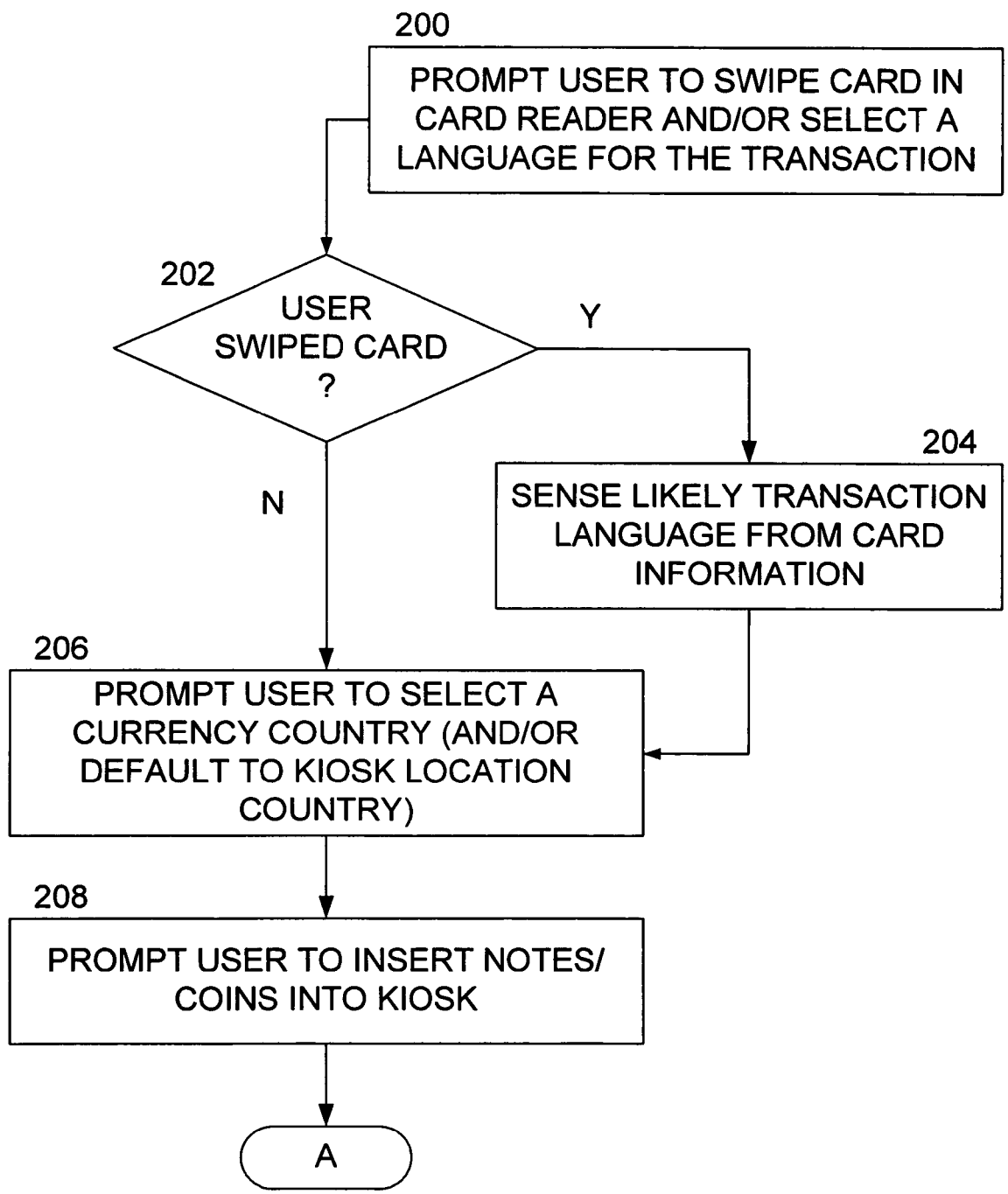

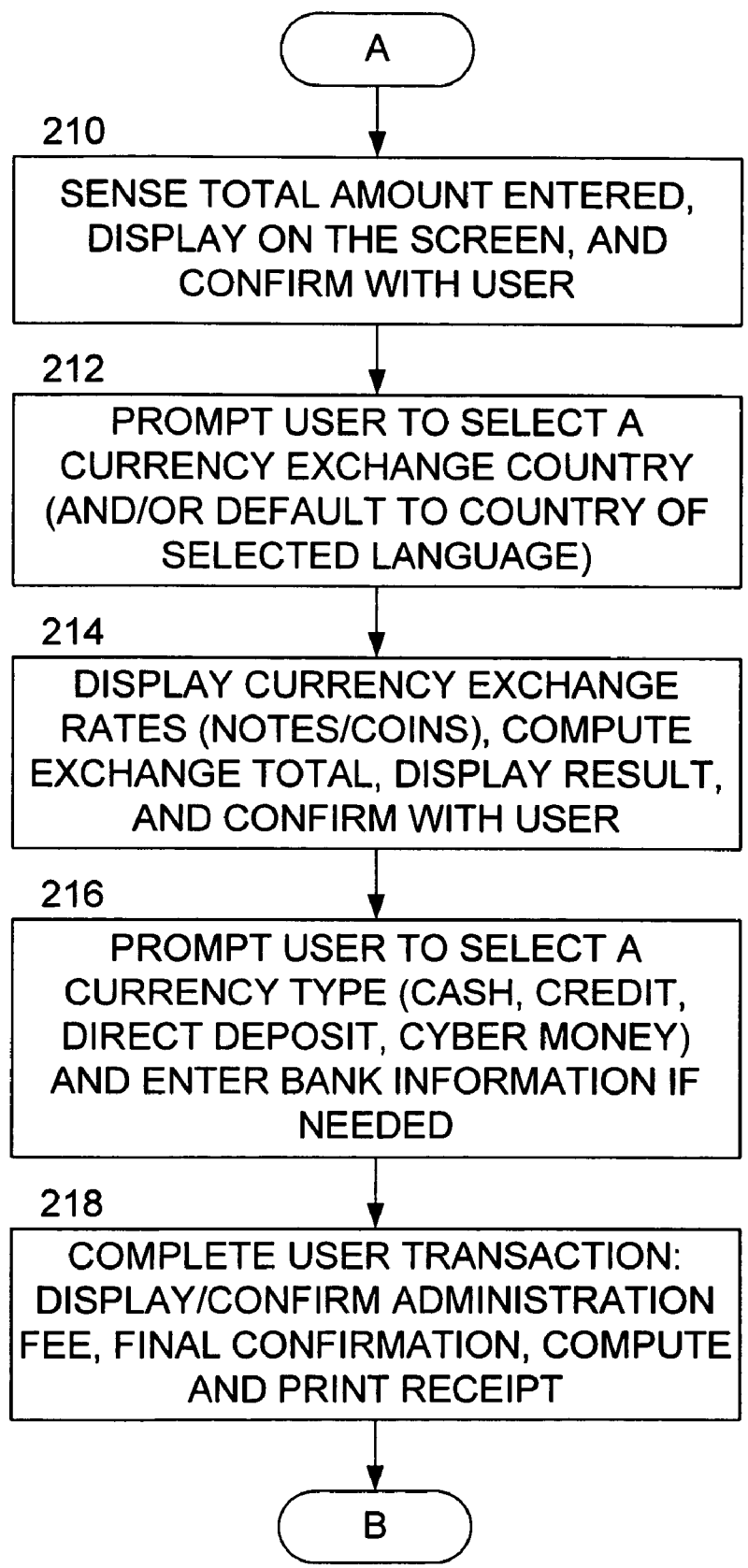

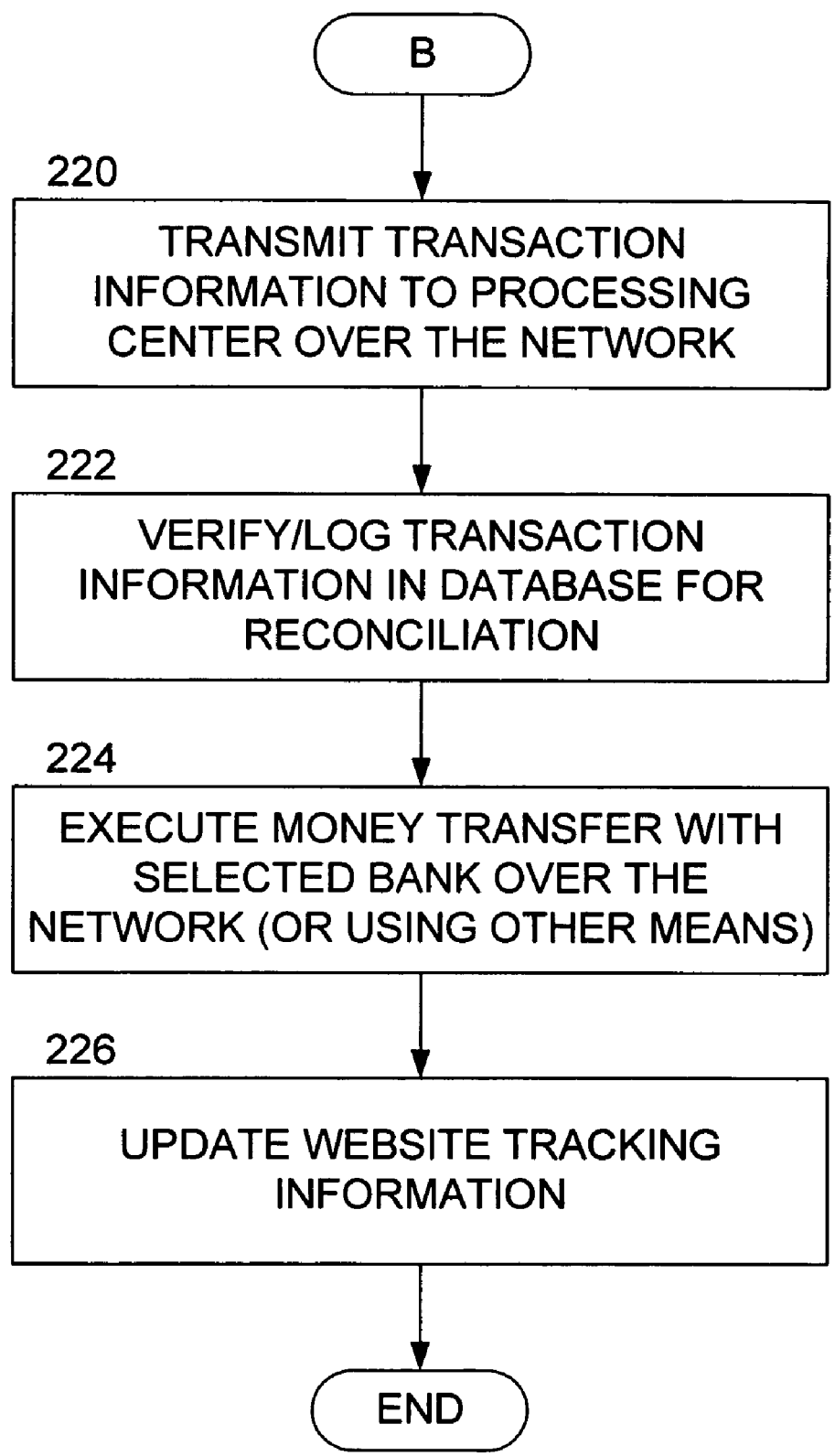

METHODS AND APPARATUS FOR FACILITATING A CURRENCY EXCHANGE TRANSACTION

BACKGROUND OF THE INVENTION

The present invention relates to methods and apparatus for facilitating a currency exchange transaction.

An international traveler, such as a tourist, a businessman, etc., may arrive in a foreign country and obtain local currency with which to conduct purchasing transactions, such as buying food, traveling, paying for hotel accommodations, etc. After completing their business and/or pleasure activities, the international traveler may arrive at the airport, railway station, and/or seaport and wish to exchange the local currency remaining from their visit, particularly coins.

Unfortunately, the international traveler's options to exchange the local currency into his or her native currency are limited. Indeed, long lines and inconvenient locations associated with manual currency exchange booths are commonplace. Further, the international traveler is often prohibited from exchanging coins. Still further, the traveler is limited in the type of currency he or she receives, i.e., cash.

Accordingly, there are needs in the art for new methods and apparatus for facilitating currency exchanges that are more convenient, permit the exchange of coins, and/or permit the traveler to select the type of currency he or she receives.

SUMMARY OF THE INVENTION

In accordance with one or more aspects of the present invention, exchange methods and apparatus provide for a visitor or traveller to exchange his/her remaining coins and/or notes, before they leave and country.

Preferably, exchange kiosks are located in international airports, seaports and railway stations for the visitor/traveller to use. Using the kiosk, the user can exchange local currency (notes and/or coins) for the currency of another country.

By way of example, the kiosk may take in the user's information (via a debit card etc) and display instructions for using the kiosk in a suitable language. The user may insert the local currency, the exchange is performed automatically, and a receipt is produced. The receipt may be a cash bearer instrument. The kiosk may send data concerning the transaction (e.g., the user's information, the amount exchanged, etc.) to a central computer, located locally, in another country, or a distributed system. The central computer preferably sorts the collected data and then, sends it to a computer in the user's home country. The central computer in the user's home country may then perform a money transfer into the user's bank account, or other account (credit account, debit account, cyber money account, etc.). Thereafter the user may perform a cash withdrawal (or other debit activity) to obtain the funds. In one or more embodiments, the issued receipt may be used to make a cash withdrawal at the user's bank. This may be accomplished in one or more embodiments by making the receipt a cash bearer instrument and using the receipt to obtain the cash at the user's bank or another bank willing to cash the instrument.

Preferably users can check the transaction status using the Internet, by accessing a website.

In accordance with one or more aspects of the present invention, a methods and apparatus provide for: prompting a user to enter currency of a first country including at least one of notes and coins into a foreign exchange kiosk; applying one or more currency exchange rates to a total of the entered currency to compute a converted currency amount of a second country; and conducting a money transfer with a third party based on the converted currency amount.

The methods and apparatus may also provide for: defaulting the first country to correspond with a location of the kiosk; and/or prompting the user to select the first country using an input device of the kiosk.

The methods and apparatus may also provide for reading card information from a card swiped into the kiosk to determine a language in which to display information on the kiosk. The methods and apparatus may also provide for: defaulting the second country to correspond with the determined language; and/or prompting the user to select the second country using an input device of the kiosk.

The methods and apparatus may also provide for at least one of: displaying the total of the entered currency on a display screen of the kiosk; and prompting the user to confirm the total of the entered currency.

The methods and apparatus may also provide for at least one of: displaying the at least one exchange rate on a display screen of the kiosk; and prompting the user to confirm that at least one exchange rate is accepted. The methods and apparatus may also provide for displaying a first exchange rate associated with the notes and a second exchange rate associated with the coins.

The methods and apparatus may also provide for at least one of: displaying one or more currency types into which the user may convert the entered currency; and prompting the user to select one of the currency types. The one or more currency types may include at least one of cash, credit card account, direct deposit account, and cyber money.

The methods and apparatus may also provide for at least one of: displaying a transaction fee a display screen of the kiosk; and prompting the user to confirm that the transaction fee is accepted.

The methods and apparatus may also provide for: transmitting transaction information to a processing center over a communications network, the transaction information including at least one of the entered currency, the first country, the second country, the currency type, information concerning the third party, and the transaction fee; and executing a money transfer to the third party based on the converted currency amount.

The methods and apparatus may also provide for updating a website in communication with the processing center such that the user may obtain status information concerning the transaction by accessing the website.

In accordance with one of more further aspects of the present invention an apparatus includes: a processor operable to execute actions in response to program instructions; a display operatively coupled to the processor and adapted to display indicia to a user in accordance with the processor; a hard currency input device operable to receive hard currency input from the user and to store same within the apparatus; and a network interface operable to transmit and receive messages over a communications network, wherein the processor is further operable to: (i) display a prompt to the user on the display to enter currency of a first country including at least one of notes and coins into the hard currency input device; and (ii) apply one or more currency exchange rates to a total of the entered currency to compute a converted currency amount of a second country.

Other aspects, features, and advantages of the present invention will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

FIG. 3 is a flow diagram illustrating process steps that maybe carried out by one or more elements of the system of FIG. 1 in accordance with one or more further aspects of the present invention;

FIG. 4 is a flow diagram illustrating further process steps that maybe carried out by one or more elements of the system of FIG. 1 in accordance with one or more further aspects of the present invention; and FIG. 5 is a flow diagram illustrating still further process steps that maybe carried out by one or more elements of the system of FIG. 1 in accordance with one or more further aspects of the present invention.

DETAILED DESCRIPTION OF THE PREFERRED EMBODIMENTS

Figure 1:
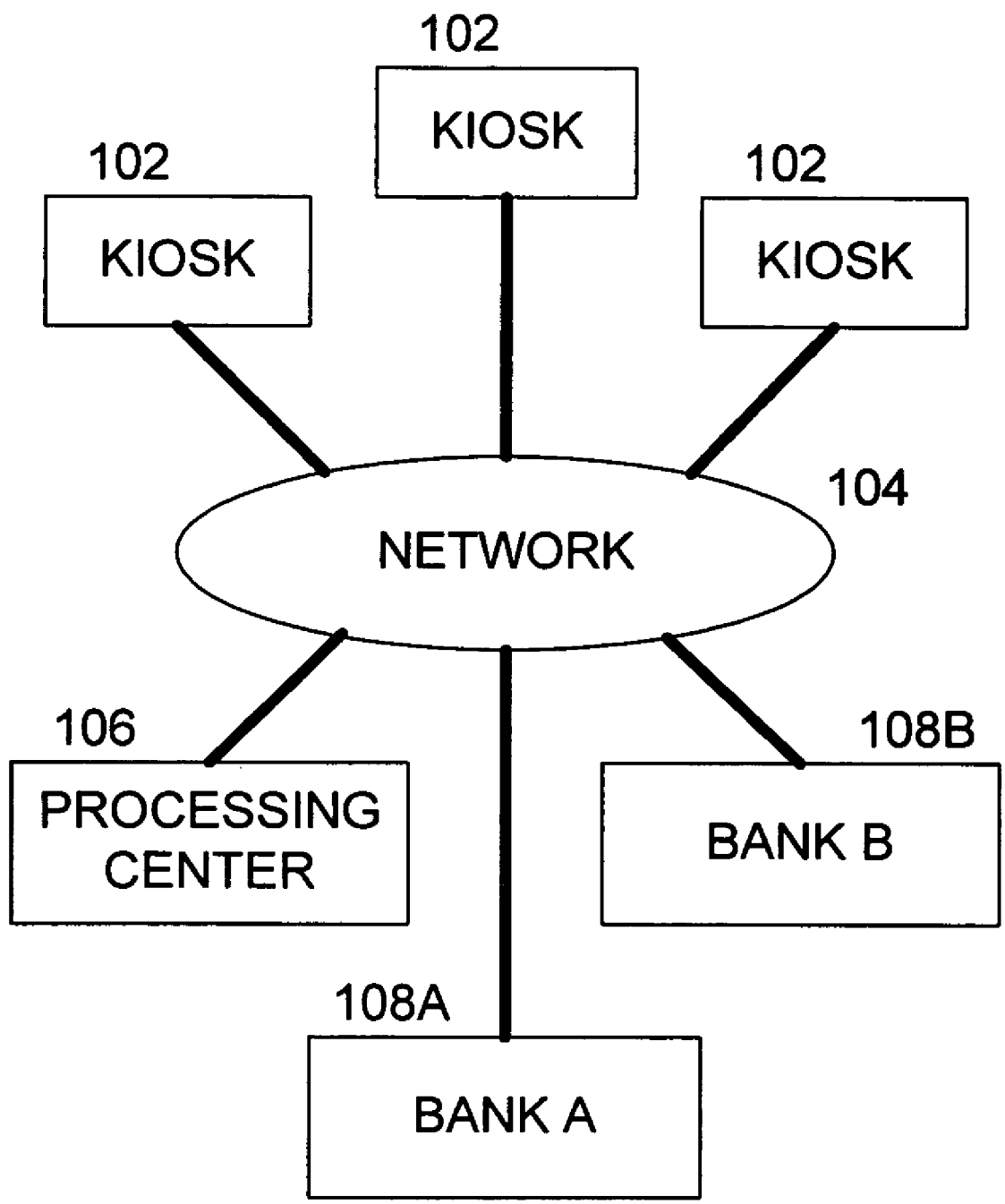
FIG. 1 is a block diagram for a currency exchange system suitable for facilitating a currency exchange in accordance with one or more aspects of the present invention.

With reference to the drawings, wherein like numerals indicate like elements, there is shown in FIG. 1 at least a portion of a currency exchange system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The system 100 includes a plurality of kiosks 102, a processing center 106, one or more banks 108A, 108B, etc., and a network 104 (such as the Internet) interconnecting these components. The kiosks 102 are foreign currency exchange apparatus that are operable to permit a user to exchange his or her currency for the currency of another country. The kiosks 102 are preferably located in areas through which international travelers frequent, including international airports, seaports, railway stations, etc. The processing center 106 may be located anywhere in the world and may be a single or distributed system through which respective transactions at the kiosks 102 are processed and completed vis-à-vis the one or more banks 108.

In use, an international traveler, such as a tourist, a businessman, etc., may arrive in a foreign country and obtain local currency with which to conduct purchasing transactions, such as buying food, traveling, paying for hotel accommodations, etc. After completing their business and/or pleasure activities, the international traveler may arrive at the airport, railway station, and/or seaport and wish to exchange the local currency remaining from their visit, particularly coins. The international traveler may utilize a kiosk 102 located in the airport, railway station, and/or seaport in order to carry out such exchange of currency.

Figure 2:
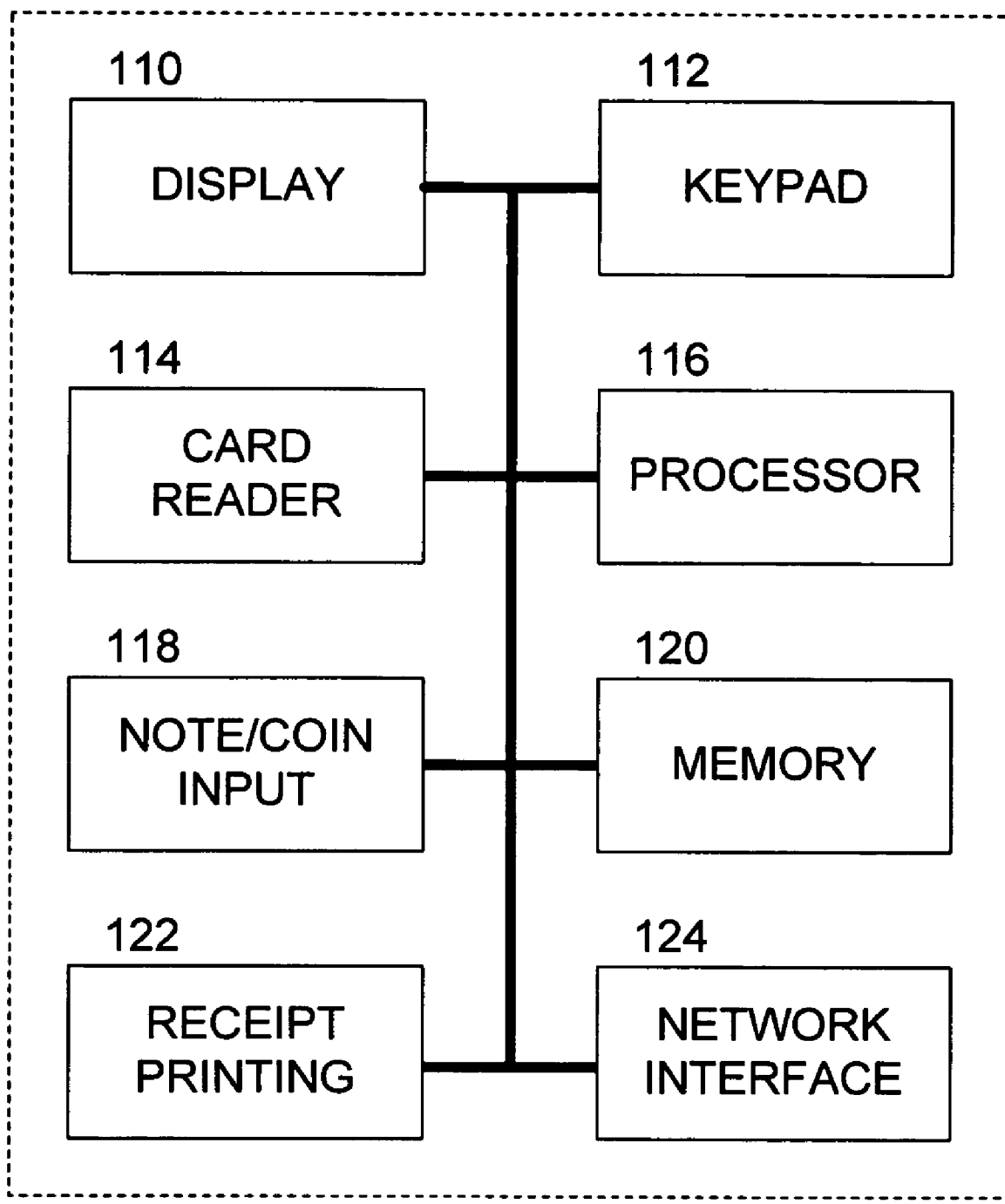
FIG. 2 is a block diagram of a currency exchange kiosk of the system of FIG. 1 in accordance with one or more aspects of the present invention.

Reference is now made to FIG. 2, which is a block diagram illustrating a preferred structure for a kiosk 102. The kiosk 102 preferably includes a display 110, an input device 112, a card reader 114, a processor 116, a note/coin input device 118, a memory unit 120, a receipt printing unit 122, and a network interface 124.

The display may employ any of the known technologies, such as cathode ray tube (CRT) technologies, liquid crystal display (LCD) technology, plasma display technology, etc. The input device 112 is preferably operable to receive information from a user of the kiosk 102, such as by way of a keypad, audio sensory circuitry, etc. It is noted that the input device 112 may encompass touch screen technology, which may be integrated with the display 110 as is known in the art. Although not shown in FIG. 2, the kiosk 102 may also include appropriate audio circuitry to complement any indicia put up on the display 110 and/or to complement the input device 112.

The card reader 114 is preferably operable to receive any of the known card technologies, such as credit card, ATM card, debit card, smart card, etc. The card reader circuit 114 is adapted to read information from a card input by the user and deliver such information to the processor 116 in order to facilitate a currency exchange transaction as will be described in more detail hereinbelow.

The processor 116 may be implemented utilizing any of the known technologies that are capable of obtaining data from various input devices and/or the memory 120 and manipulating the data to achieve a desirable result. For example, the processor 116 may be implemented using any of the known microprocessors that are capable to executing software and/or firmware, including standard microprocessors, distributed microprocessors, etc.

The note/coin input device 118 is preferably operable to receive currency in the form of notes and/or coins, store same within the kiosk 102 and provide signaling to the processor 116 and/or the memory 120 indicative of the amount of currency received. It is noted that the note/coin input device 118 may be operable to receive currency of only one country or may be operable to receive currency from different countries as is known in the art. It is understood that the technology employed by the note/coin input device 118 is capable of sensing the denominations of the currency input and producing signaling indicative of such denominations.

The memory 120 may be a single memory circuit or may be distributed throughout one or more of the other elements of the kiosk 102. Preferably, the memory 120 includes a random access memory (RAM) portion that is operatively interconnected with the processor 116 to achieve desirable computing capabilities. The memory circuit 120 may also include read only memory (ROM) portions that contain software program(s) suitable for execution by the processor 116 and/or other components of the kiosk 102 to achieve the functionality described herein.

The receipt printing unit 122 is preferably operable to produce hard copy receipts upon instruction by the processor 116 that memorialize various aspects of the currency exchange transaction that are useful to the user. In one or more embodiments, the issued receipt may be a cash bearer instrument.

The network interface circuit 124 is preferably operable to interconnect one or more elements of the kiosk 102 with the network 104 to achieve communications with at least the processing center 106 as will be described in more detail hereinbelow.

The functionality and interoperability of the elements of the kiosk 102 may be better understood with reference to FIGS. 3–5, which are flow diagrams illustrating actions that may be carried out by the kiosk 102 and/or other elements of the system 100 in order to achieve the currency transaction capabilities of the present invention. At action 200, the user is prompted to swipe his or her card into the card reader 114 of the kiosk 102. This may entail displaying indicia on the display 110 providing such a prompt to the user. As the nationality of the user is likely unknown to the kiosk 102, the indicia may be displayed in multiple languages, including one or more international languages, such as English or French. In an alternative embodiment of the present invention, the user may be prompted to select a language in which to carry out the transaction as opposed to swiping a card into the card reader 114. In this embodiment, the user may select a language by manipulating an input device 112 (e.g., via a keypad or touch screen).

At action 202, a determination is made as to whether the user has swiped a card into the card reader 114. If a result of the determination is in the affirmative, then the information obtained by the card reader 114 is preferably provided to the processor 116. The processor 116 is preferably operable to sense the likely transaction language from the information obtained from the card. For example, if the user swipes a credit card into the card reader 114, then certain information on the card may indicate the country of origin of the card and/or user and the processor 116 may sense such country of origin and establish a language for the transaction (action 204).

In any case, once a language for the transaction is established, the user is preferably prompted to select a currency country using the input device 112. In an alternative embodiment of the present invention, the country in which the kiosk 102 is located may be the default currency country and the note/coin input device 118 may be specifically adapted to receive the local currency in which the kiosk 102 is disposed (action 206).

At action 208, the user is preferably prompted to enter currency, which may include notes and/or coins, into the note/coin input device 118 of the kiosk 102. The note/coin input device 118 preferably senses the respective denominations of the entered currency and produces signaling that is useful in sensing the total amount of currency entered (action 210). More particularly, either the note/coin input device 118 itself or a collaborative effort between that device and the processor 116 may be established to sense the total amount of currency entered into the kiosk 102. The total amount of currency entered is preferably displayed on the display device 110 so that the user may confirm the amount utilizing the input device 112 (e.g., keypad, touch screen technology, audio sensing technology, etc.).

At action 212, the user is preferably prompted (e.g., via the display 110 and/or audio device) to select a currency exchange country. In an alternative embodiment of the present invention, the currency exchange country may be established by default to correspond with the selected language. For example, when the user selects the Japanese language, the processor 116 may automatically select the currency exchange country to be Japan. Preferably, however, the user is provided with an opportunity to confirm the defaulted currency exchange country by way of the input device 112.

At action 214, at least one exchange rate is preferably displayed on the display 110 of the kiosk 102, where the exchange rate corresponds with the currency exchange as between the local currency being exchanged and the selected currency exchange country. In a preferred embodiment, two exchange rates are displayed, one exchange rate being for notes and another exchange rate being for coins. The user is preferably provided with an opportunity to confirm the exchange rate, e.g., by way of entering an affirmation via the input device 112. Also at action 214, the processor 116 is preferably operable to compute a converted currency amount in the currency exchange country by applying the one or more currency exchange rates to the total of the entered currency. The converted currency amount is preferably displayed on the display 110 and the user is provided with an opportunity to confirm this amount by way of the input device 112.

At action 216, the user is preferably prompted to select a currency type by way of the display 110, such as cash, credit, direct deposit, cyber money, etc. The user is preferably provided with the opportunity to select the currency type by way of the input device 112. This may entail prompting the user to enter banking information. For example, when the user wishes to obtain cash, the user is preferably prompted to provide information concerning a bank 108 in the currency exchange country to which the user may later visit to collect the cash. The banking information may include the name of the bank, the account name, the account number, etc.

In one or more embodiments, the receipt printing device 122 may issue a receipt that may be used to make a cash withdrawal at the user's bank or any other bank willing to honor the receipt. This may be accomplished in one or more embodiments by making the receipt a cash bearer instrument and using the receipt to obtain the cash at the user's bank or another bank willing to cash the instrument.

Alternatively, the user may be prompted to enter a credit card number and/or swipe a credit card into the card reader 114 to provide the kiosk 102 with the requisite information to complete a transfer of funds to a credit card account. Similarly, the user may be prompted to enter information regarding direct deposit and/or cyber money transfers if the user desires to have a credit to those types of accounts.

At action 218, the transaction with the kiosk 102 is preferably completed, which may entail assessing an administration fee. When an administration fee is contemplated, such fee is preferably displayed on the display 110 and the user is provided with an opportunity to confirm the fee by way of the input device 112. The processor 116 preferably commands the receipt printing unit 122 to print a receipt memorializing at least some of the parameters of the currency exchange transaction.

At action 220, the kiosk 102 preferably transmits transaction information to the processing center 106 over the network 104. This preferably entails the processor 116 collecting and packaging the transaction information and transferring such information through the network interface 124 for transmission over the network 104. The transaction information may include one or more of the entered currency, the local country, the currency exchange country, the currency type, information concerning the third party recipient, such as the credit card account, the direct deposit account, the cyber money account, etc., and the transaction fee.

The processing center 106 may be located in the same country as the kiosk 102 utilized by the traveler, it may be located in any other country, and/or it may be a distributed system. When a distributed system, the processing center may also have a presence in the exchange country and the transaction information may be transmitted there from the local country for further processing. The processing center 106 preferably verifies and/or logs the transaction information into a database for reconciliation purposes (action 222). Thereafter, the processing center 106 preferably executes a money transfer with the selected third party, such as a bank, credit card company, cyber money account, etc., over the network 104 to complete the transaction. It is noted that the money transfer need not be conducted over the network 104 (although this is preferred); indeed, the money transfer may be achieved utilizing any means as between the processing center 106 and the third party.

At action 226, the processing center 106 is preferably operable to facilitate the updating of website tracking information such that a user of the kiosk 102 may later access the website to determine the status of the transaction. Preferably, this entails the user being provided with a unique user ID and/or password, which may be established at the time that the user interacts with the kiosk 102. For example, the user ID and/or password may be provided to the user by way of the receipt produced by the receipt printing unit 122.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    displaying a first currency exchange rate associated with notes and a second currency exchange rate associated with coins on a display screen of a foreign exchange kiosk, wherein said first exchange rate said exchange rate are different;
    prompting a user to enter currency of a first country into said foreign exchange kiosk;
    applying one or more of said currency exchange rates to a total of the entered currency to compute a converted currency amount of a second country; and
    conducting a money transfer with a third party based on the converted currency amount.

2. The method of claim 1, further comprising at least one of:
    defaulting the first country to correspond with a location of the kiosk; and
    prompting the user to select the first country using an input device of the kiosk.

3. The method of claim 1, further comprising: reading card information from a card swiped into the kiosk to determine a language in which to display information on the kiosk.

4. The method of claim 3, further comprising at least one of:
    defaulting the second country to correspond with the determined language; and
    prompting the user to select the second country using an input device of the kiosk.

5. The method of claim 1, further comprising at least one of:
    displaying the total of the entered currency on said display screen of the kiosk; and
    prompting the user to confirm the total of the entered currency.

6. The method of claim 1, further comprising:
    prompting the user to confirm that the one or more exchange rates are accepted.

7. The method of claim 1, further comprising at least one of:
    displaying one or more currency types into which the user may convert the entered currency; and
    prompting the user to select one of the currency types.

8. The method of claim 7, wherein the one or more currency types includes at least one of cash, credit card account, direct deposit account, and cyber money.

9. The method of claim 1, further comprising at least one of:
    displaying a transaction fee on said display screen of the kiosk; and
    prompting the user to confirm that the transaction fee is accepted, wherein said displaying, prompting, applying, and conducting steps provide a transaction.

10. The method of claim 9, further comprising:
    transmitting transaction information to a processing center over a communications network, the transaction information including at least one of the entered currency, the first country, the second country, a currency type, information concerning the third party, and the transaction fee; and
    executing a money transfer to the third party based on the converted currency amount.

11. The method of claim 10, further comprising: updating a website in communication with the processing center such that the user may obtain status information concerning the transaction by accessing the website.

12. The method of claim 1 wherein the prompting comprises prompting the user to enter the currency of the first country including notes and coins into the foreign exchange kiosk.

13. An apparatus, comprising:
    a processor operable to execute actions in response to program instructions;
    a display operatively coupled to the processor and adapted to display indicia to a user in accordance with the processor;
    a hard currency input device operable to receive hard currency input from the user and to store same within the apparatus; and
    a network interface operable to transmit and receive messages over a communications network,
    wherein the processor is further operable to: (i) display a first exchange rate associated with notes and a second exchange rate associated with coins; (ii) display a prompt to the user on the display to enter currency of a first country into the hard currency input device, wherein said first exchange rate and said second exchange rate are different; and (iii) apply one or more of said currency exchange rates to a total of the entered currency to compute a converted currency amount of a second country.

14. The apparatus of claim 13, wherein the processor is further operable to at least one of:
   default the first country to correspond with a location of the apparatus; and
   prompt the user via the display to select the first country using an input device of the apparatus.

15. The apparatus of claim 13, further comprising a card reading device operable to read card information from a card swiped by the user, wherein the processor is further operable to determine a language in which to display information on the kiosk.

16. The apparatus of claim 15, wherein the processor is further operable to at least one of:
   default the second country to correspond with the determined language; and
   prompt the user via the display to select the second country using an input device of the apparatus.

17. The apparatus of claim 13, wherein the processor is further operable to at least one of:
   display the total of the entered currency on the display; and
   prompt the user via the display to confirm the total of the entered currency.

18. The apparatus of claim 13, wherein the processor is further operable to:
   prompt the user via the display to confirm that the one or more exchange rates are accepted.

19. The apparatus of claim 13, wherein the processor is further operable to at least one of:
   display one or more currency types into which the user may convert the entered currency; and
   prompt the user via the display to select one of the currency types.

20. The apparatus of claim 19, wherein the one or more currency types includes at least one of cash, credit card account, direct deposit account, and cyber money.

21. The apparatus of claim 13, wherein the processor is further operable to at least one of:
   display a transaction fee on the display; and
   prompt the user via the display to confirm that the transaction fee is accepted.

22. The apparatus of claim 21 wherein the processor is further operable to cause the network interface to transmit transaction information to a processing center over the communications network, the transaction information including at least one of the entered currency, the first country, the second country, a currency type, information concerning a third party, and the transaction fee.

23. The apparatus of claim 13, wherein the processing center is operable to execute a money transfer to a third party based on the converted currency amount.

24. The apparatus of claim 13 wherein said displaying comprises displaying a prompt to the user on the display to enter the currency of the first country including notes and coins into the hard currency input device.

* * * * *

UNITED STATES PATENT AND TRADEMARK OFFICE
CERTIFICATE OF CORRECTION

PATENT NO.         : 7,140,538 B2                                           Page 1 of 1
APPLICATION NO. : 10/947037
DATED              : November 28, 2006
INVENTOR(S)        : Seon Ho Lee It is certified that error appears in the above-identified patent and that said Letters Patent is hereby corrected as shown below:

Claim 1, Col. 7 line 53, after the word "rate", insert the word --and--

Claim 1, Col. 7 line 53, before the second occurrence of the word "exchange", insert the word --second--.

Signed and Sealed this

Twenty-fourth Day of June, 2008

JON W. DUDAS
*Director of the United States Patent and Trademark Office*